United States Patent
Morin et al.

(12) 
(10) Patent No.: US 6,196,507 B1
(45) Date of Patent: Mar. 6, 2001

(54) CLAMP ASSEMBLY FOR PICK-UP TRUCK TOPPER

(76) Inventors: Yvon Morin, 144 Raug, St-Pierre St, Anselme Zui (CA), G0R 2N0; Kenneth J. Morey, 8840 210 Street, Langley, B.C. (CA), V1M 2X2

( * ) Notice: Subject to any disclaimer, the term of this patent is extended or adjusted under 35 U.S.C. 154(b) by 0 days.

(21) Appl. No.: 09/431,074

(22) Filed: Nov. 1, 1999

(51) Int. Cl.$^7$ ................. B60P 3/377; B60P 7/06
(52) U.S. Cl. ............. 248/231.51; 248/292.12; 296/100.04; 296/167; 74/89.14; 74/425
(58) Field of Search ............. 296/167, 100.04, 296/100.07; 248/222.52, 229.13, 229.23, 231.51, 231.9, 284.1, 292.12, 316.5; 403/322.1, 322.3; 74/89.14, 425; 280/769

(56) References Cited

U.S. PATENT DOCUMENTS

| | | | |
|---|---|---|---|
| 3,503,647 | * 3/1970 | Gostomski | 296/167 |
| 3,640,565 | * 2/1972 | Anderson | 296/100.04 |
| 4,261,611 | * 4/1981 | Barry et al. | 296/100.1 |
| 4,522,440 | * 6/1985 | Gostomski | 296/100.1 |
| 4,789,196 | * 12/1988 | Fields | 296/100.18 |
| 5,018,777 | * 5/1991 | Swenson et al. | 296/100.07 |
| 5,462,249 | * 10/1995 | Calzone | 248/316.7 |
| 5,765,902 | * 6/1998 | Love | 296/100.01 |

FOREIGN PATENT DOCUMENTS

2083300 * 2/1998 (CA).

* cited by examiner

*Primary Examiner*—Ramon O. Ramirez
*Assistant Examiner*—Jon Szumny
(74) *Attorney, Agent, or Firm*—Swabey Ogilvy Renault

(57) ABSTRACT

A clamp assembly for releasably securing a cab or other truck toppers to a pick-up truck box includes master and slave assemblies mounted to a transverse section of the sidewall of the cab and spaced-apart from each other. Each assembly has an engagement member pivotable between an operative position in which the engagement member extends beneath an inwardly extending flange of the sidewall of the truck box and abuts the undersurface of the flange, and an inoperative position in which the engagement member clears the flange. A set of worm and worm gear is provided in the master assembly and a worm gear shaft extends through the master and slave assemblies to drive the engagement members in the pivotal movement. The clamp assembly is operated using a rotating tool from inside of the cab so that unauthorized removal of the cab from the truck is prevented. The use of the clamp assembly not only advantageously reduces the labor required to secure the cab to the truck box but also permits, in a limited extent, a discrepancy between the truck box and the cab in instant deformation.

12 Claims, 5 Drawing Sheets

CLAMP ASSEMBLY FOR PICK-UP TRUCK TOPPER

TECHNICAL FIELD

This invention relates generally to land vehicles, bodies and tops and, more particularly, to clamp assemblies for releasably securing a topper to a pick-up truck.

BACKGROUND OF THE INVENTION

In recent years, pick-up toppers have become popular and appear on the market in a variety of different shapes, models and designs, such as campers, caps and cabs. These units are lifted onto the truck bed and anchored to the truck box by clamp assemblies or other types of holddown brackets.

Pick-up truck boxes include a bottom wall, sidewalls, an end wall and a tailgate with the wheel wells projecting into the box. The tops of the sidewalls extend inwardly toward each other, thus forming opposing transverse flanges which are disposed over the bottom wall of the truck box. The design of the sidewalls and the transverse flanges for each manufacture, however, are different, thus necessitating a plurality of different clamp assemblies or holddown brackets to supply the market.

A clamp assembly for securing a topper onto the pick-up truck box must be robust to prevent the topper from bouncing off the truck box while travelling on rough terrain, sliding off the box when travelling up a hill, or from sliding or slamming into the end wall and cab of the truck when travelling downhill or in the event of a sudden stop. The clamp assembly is also expected to be simple for operating, easily accessible for securing the topper to or releasing it from the pick-up truck box because the pick-up truck may be used for other purposes.

Prior art has focused on those objects and various types of clamp assemblies, holddown brackets or locking devices have been created. U.S. Pat. No. 3,503,647, entitled CAMPER HOLDDOWN BRACKET and issued to Gostomski on Mar. 31, 1970, for example, describes a universal camper holddown bracket for securing a camper to the bed of a pick-up truck having lipped sidewalls. In response to a movement of a slidable rod, an arm is pivotable from a non-locking engagement to a locking engagement with the lip, and enabled to be locked in the locking engagement position. The slidable rod, however, is operated from the outer side of the camper. This is somehow a disadvantage in respect to security considerations.

Another example is described by Thibault in his Canadian Patent No. 2,083,300 which is entitled QUICK-RELEASE LOCK FOR PICK-UP TRUCK TOPPER and issued Feb. 3, 1998. Thibault describes a pivotal handle bar assembly including a removable pivotable handle, projecting inside the topper enclosure, and a fulcrum end with an elastomeric pad to frictionally anchor the topper to the truck box. Release of the handle bar lock is possible only from within the topper enclosure. The elastomeric pad, however, is not durable and too soft to firmly secure the topper to the truck box, particularly under vibration and impact when the vehicle travels on rough terrain. Another disadvantage relates to the manner and structure for adjusting the distance from the fulcrum end to the pivot pin in order to fit in with the needs of vehicles of different makes and models. A telescoping tubing structure with locking pin is used to adjust the length of the pivotal handle bar, which has to be manually down before the assembly is installed to the topper.

Practically, a topper is usually anchored onto the pick-up truck box at four points, that is, a front place and a rear place at each side. Four identical clamp assemblies are used and operated individually one after another to lock the topper to the truck box. The structural rigidity of the topper and the pick-up truck box are different since the topper is usually an enclosure structure such as a cab or camper, while the truck box is an open structure. When the vehicle travels on rough terrain, the pick-up truck box may be instantly twisted to an extent that the relatively rigid cab or camper cannot follow the instant deformation of the pick-up truck box and, therefore, tension is resulted to break the clamp assemblies.

There therefore exists the need for continuous improvements of clamp assemblies for use in such applications.

SUMMARY OF THE INVENTION

It is an object of the present invention to provide a clamp assembly mountable on a self-enclosed topper for securing the same to a pick-up truck box, which enables a single operator to easily and quickly install or remove the topper, yet preventing unauthorized release therefrom.

It is another object of the present invention to provide a clamp assembly which is adaptable, without modification to various sizes and makes of pick-up trucks.

It is a further object of the present invention to provide a clamp assembly used for securing a self-enclosed topper to the pick-up truck box, which includes master and slave assemblies and enables more than one place to be secured in one operation.

It is yet a further object of the present invention to provide a clamp assembly which secures a self-enclosed topper to a pick-up truck box at securing points with different rigidities to permit the topper and the truck box to instantly deform differently while reliably securing features are maintained.

In accordance with one aspect of the invention, a clamp assembly is provided for releasably securing a topper to a pick-up truck box having sidewalls each with an inwardly extended flange, the topper including sidewalls having transverse offset sections to extend over the sidewalls of the pick-up truck box respectively, wherein the clamp assembly comprises: a first elongate engagement member adapted to be pivotally mounted to either one of the sidewalls of the topper so that the first engagement member is pivotable between an operative position in which a free end of the first engagement member extends beneath the inwardly extended flange and forcibly abuts a undersurface of the flange, and an inoperative position in which the free end of the first engagement member clears the flange; a rotating device operatively connected to the first engagement member to convert a rotation about an axis substantially perpendicular to a pivotal shaft of the first engagement member to a pivotal movement of the first engagement member between the operative and inoperative positions; and a locking device to lock the first engagement member in the operative position.

The abutment of the first engagement member against the flange is preferably achieved through an abutment member. The abutment member is pivotally mounted to the free end of the engagement member and adapted to be adjustably guided between an inner surface of the sidewall of the pick-up truck box and a downwardly suspending edge of the flange into a position to properly abut the undersurface of the flange when the first lock member is pivotally moved into the operative position.

In accordance with another aspect of the invention, the clamp assembly comprises a master and a slave assembly. Each of the master and slave assemblies include a elongate engagement member pivotable between the operative position and the inoperative position. The elongate engagement members of the master and slave assemblies are adapted to be pivotally mounted to the same transverse offset section of the topper and spaced-apart from each other. The first lock member of the slave assembly is operatively connected to the pivotal shaft of the engagement member of the master assembly so that the engagement member of the slave assembly is manipulated between the operative and inoperative positions, locking and unlocking conditions following the performance of the master assembly when the engagement member of the master assembly is driven by a rotating device, and locked and unlocked by a locking device.

In a more specific term in accordance with a preferred embodiment of the invention, the clamp assembly comprises a master assembly and a slave assembly. Each of the master and slave assemblies includes base plates adapted to be mounted to an undersurface of the transverse offset section of the same sidewall of the topper, and spaced-apart from each other. The master assembly further includes a worm and a worm gear operatively supported within a casing that is attached to a first base plate of the master assembly. A worm shaft extends from the worm and is aligned with an aperture in the sidewall of the topper. A connector at a distal end of the worm shaft is adapted for engaging a socket of a tool operated from within the topper to rotate the worm shaft. An elongated engagement member which includes a pivotal shaft rotatably supported by the casing and driven by the worm gear, and a abutment member pivotally mounted to a free end of the engagement member so that the engagement member is pivotable between an operative position in which a free end of the engagement member extends beneath the inwardly extending flange and the abutment member is adapted to be pivotally guided between an inner surface of the sidewall of the pick-up truck box and a downwardly suspending edge of the flange into a position to properly and forcibly abut the undersurface of the flange, and an inoperative position in which the abutment member clears the flange. A locking device mounted on the worm shaft is restrained in rotation with respect to the casing and is slidable between a locking position in which the locking device engages the connector of the worm shaft to prevent the worm shaft from rotation with respect to the casing, and an unlocking position in which the locking device disengages the connector. The slave assembly further includes a elongate engagement member that is pivotally mounted on a bracket attached to one of the base plates and includes a abutment member pivotally mounted to a free end thereof. The engagement member is operatively connected to the pivotal shaft of the master assembly so that the engagement and abutment members of the slave assembly are manipulated between an operative and inoperative positions, a locking and unlocking conditions, similar to the master assembly, following the performance of the master assembly.

The clamp assembly in accordance with the present invention is easy to operate and can be operated only from the inside of the self-enclosed topper to prevent unauthorized removal of the topper from the pick-up truck. The clamp assembly in accordance with the invention may secure the topper at two or more places during one operation such that the labour for securing the topper to the pick-up truck is reduced. Furthermore, the slave assembly is located spaced-apart from the master assembly and the long extending pivotal shaft has a certain degree of flexibility in transmitting torque from the master assembly to the slave assembly. As a result, the slave assembly has a corresponding flexibility in the clamping action to permit the pick-up truck box to instantly deform differently from the self-enclosed topper while the master assembly and slave assembly secures the topper to the truck box firmly at the two locations to prevent the topper from movement relative to the truck.

BRIEF DESCRIPTION OF THE DRAWINGS

Having thus generally described the nature of the invention, reference will now be made to the accompanying drawings, shown by way of illustration of the preferred embodiments, in which.

DETAILED DESCRIPTION OF THE PREFERRED EMBODIMENT

Figure 1:
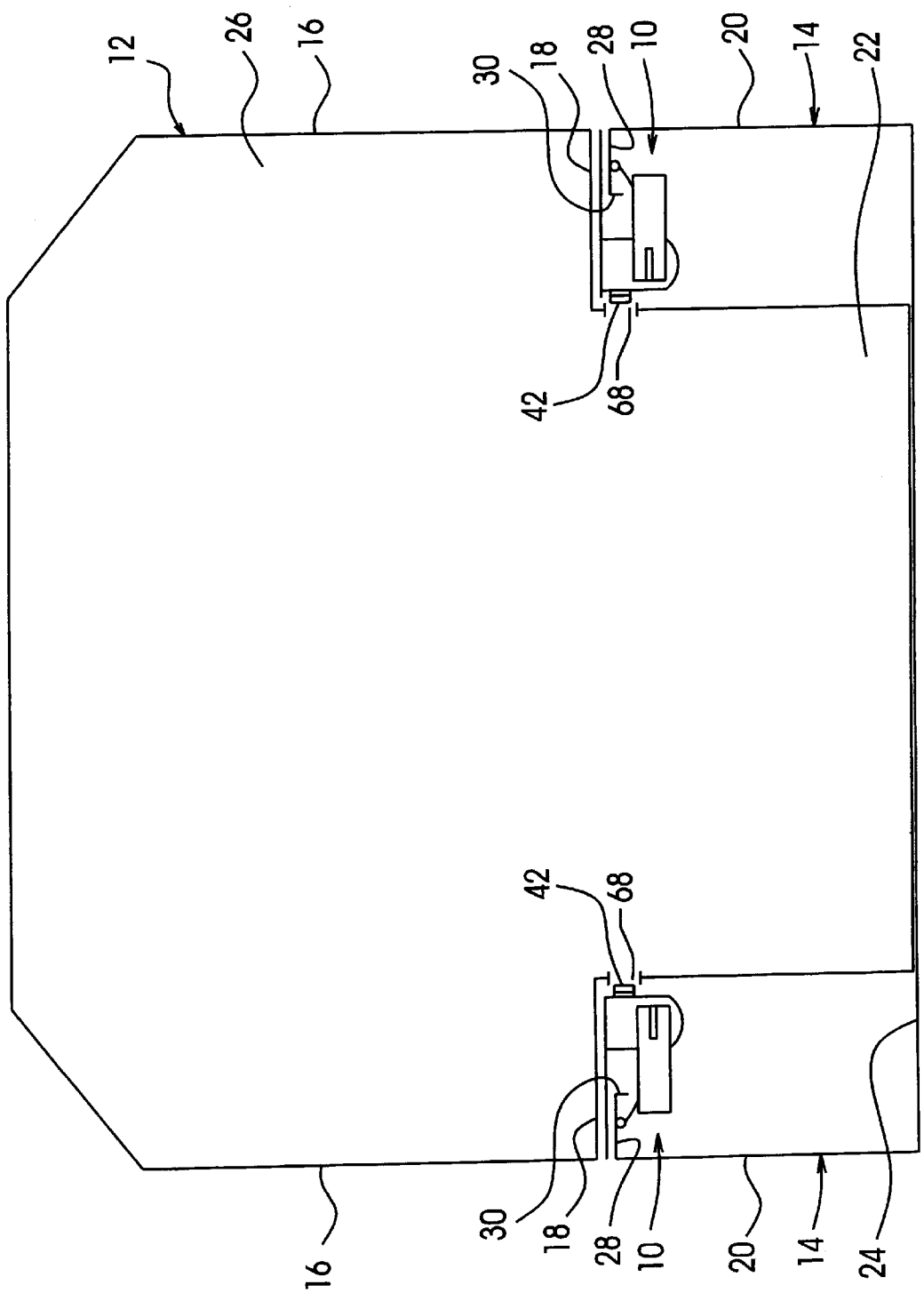
FIG. 1 is a schematic rear view of a cab installed to a pick-up truck and secured thereto by clamp assemblies incorporating a preferred embodiment of the present invention.

In FIG. 1, a clamp assembly, according to this invention, is indicated generally by numeral 10 and is used for securing a cab 12 to a pick-up truck box 14.

The cab 12 is a self-enclosed structure and includes sidewalls 16 having transverse offset sections 18 which extend laterally over the upstanding sidewalls 20 of the truck box 14. The transverse offset sections 18 define a relatively narrow bottom section 22 which mounts on the bed floor 24 of the pick-up truck box between the wheel wells (not shown) and the upstanding sidewalls 20, and a main section 26 which extends literally over the sidewalls 20.

Each sidewall 20 of the truck box has a inwardly extended flange 28 which projects towards its counterpart on the opposite sidewalls. Each flange 28 includes a downwardly suspending edge 30.

Figure 2:
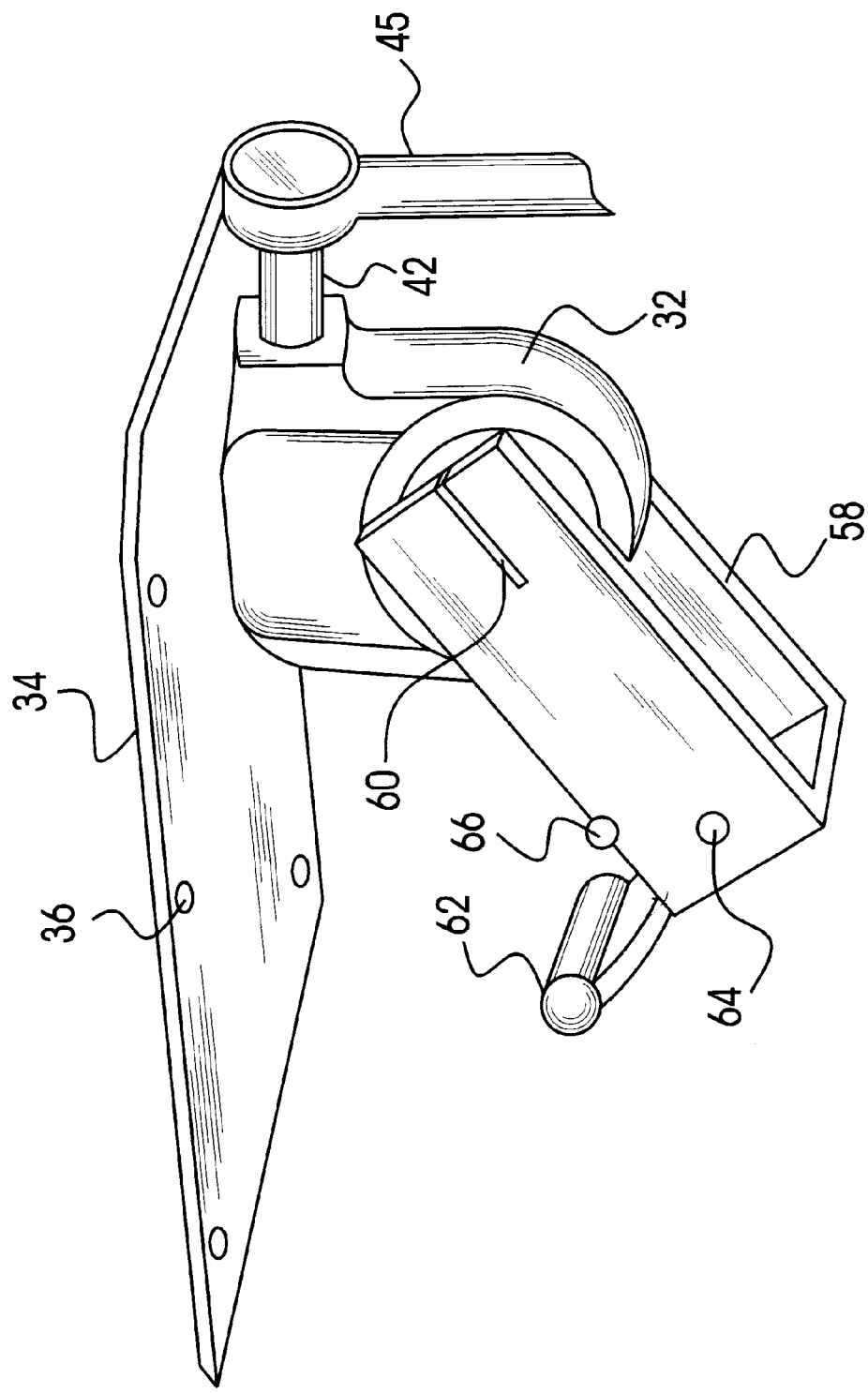
FIG. 2 is a perspective view of the preferred embodiment of the clamp assembly in FIG. 1.
Figure 3:
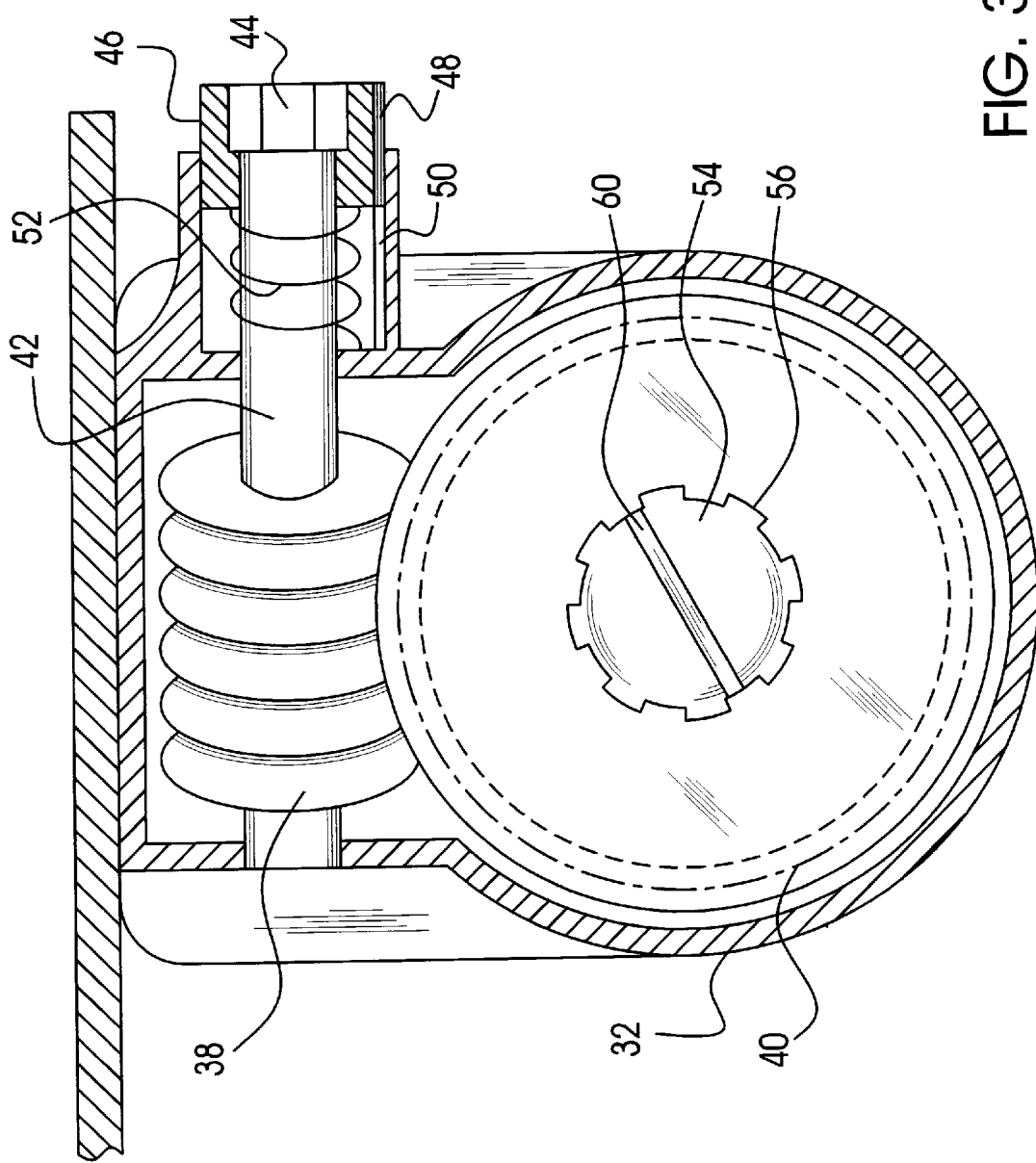
FIG. 3 is a partial cross-sectional view of the clamp assembly in FIG. 2, showing the details of the worm and worm gear assembly, and the locking device.

The clamp assembly 10 in accordance with the preferred embodiment is more clearly illustrated in FIGS. 2 and 3. A casing 32 is attached to a base plate 34 which includes mounting bores 36 and is adapted to be mounted to the undersurface of the transverse section 18 of the cab (see FIG. 1). A worm 38 and a worm gear 40 are operatively supported within the casing 32, as shown in FIG. 3. The worm 38 includes a worm shaft 42 extending from the worm 38 and has a distal end formed as a hexagon connector 44 for releasable connection of a corresponding socket of a tool 45 (see FIG. 2) which is used to rotate the worm shaft 42 and the worm 38.

A locking sleeve 46 is slidably mounted on the worm shaft 42 and is restrained in rotation with respect to the casing 32 by a key 48 fixed to the locking sleeve 46 and slidably received in a groove 50 formed in the casing 32. The locking sleeve 46 is formed as a hexagon socket at its outer end so that when the locking sleeve 46 is urged from its inner end by a spring 52 which surrounds the worm shaft 42 and is accommodated within the casing 32, it engages with the hexagon connector 44 to prevent the worm shaft 42 and the worm 38 from rotation with respect to the casing 32. The locking sleeve 46 itself is prevented from moving out of the worm shaft 42 since the hexagon connector 44 has a radial dimension slightly greater than the diameter of the worm shaft 42 and the internal diameter of the locking sleeve 46. The locking sleeve 46 is pushed back against the spring 52 and disengages the hexagon connector 44 when the hexagon connector 44 is inserted into a socket of the tool 45 to rotate the worm shaft 42 and the worm 38.

The worm 38 and the worm gear 40 convert the rotation driven by the tool 45 to the rotary movement of a worm gear shaft 54 at a much reduced rate with much increased torque. The worm gear shaft 54 is connected with the worm gear 40 using splines 56 to transmit the torque.

An engagement member 58 is fixed at one end to the worm gear shaft 54 using a key member 60 so that the worm gear shaft 54 acts as a pivoting shaft to pivot the engagement member 58 when the worm shaft 42 is driven to rotate. The engagement member 58 is made from a metal strip bent to form a U-shape structure. The open end of the U-structure is connected to the ends of the worm gear shaft 54 via the key member 60.

An abutment member 62 is pivotally mounted to the free end of the engagement member 58. The abutment member 62 at one end is inserted in the U-shape structure and mounted to a pivoting pin 64 which is supported by the U-shape structure of the engagement member 58. The pivotal movement of the abutment member 62 about the pivoting pin 64 is limited between the closed end of the U-shaped structure and a stop bar 66 which is attached to one side of the U-shaped structure, parallel to the pivoting pin 64 and spaced-apart from the closed end.

Having thus configured the structure, the engagement member 58 can pivot between an operative position in which the free end of the engagement member 58 extends beneath the inwardly extended flange 28 and the abutment member 62 forcibly abuts the undersurface of the flange, as shown in FIG. 1, and an inoperative position in which the abutment member 62 clears the flange 28 ana the cab 12 is enabled to be removed from the truck box 14. Furthermore, the free end of the abutment member 62 is rounded in cross-section and is adapted to be pivotally guided between an inner surface of the sidewall 20 of the pick-up truck box and the downwardly suspending edge 30 of the flange into a position to properly abut the undersurface of the flange 28 to compensate for dimension variations in different makes and models of the pick-up truck when the engagement member is pivoted into the operative position.

As shown in FIG. 1, the clamp assembly 10 is mounted to the cab in a position so that the worm shaft 42 aligns an aperture 68 which is defined in the sidewalls 16 of the cab at the bottom section 22 and may be covered by an openable cover, not shown. With such an arrangement, the clamp assembly 10 is operated only from the inside of the cab and unauthorized removal of the cab from the pick-up truck is prevented.

Figure 4:
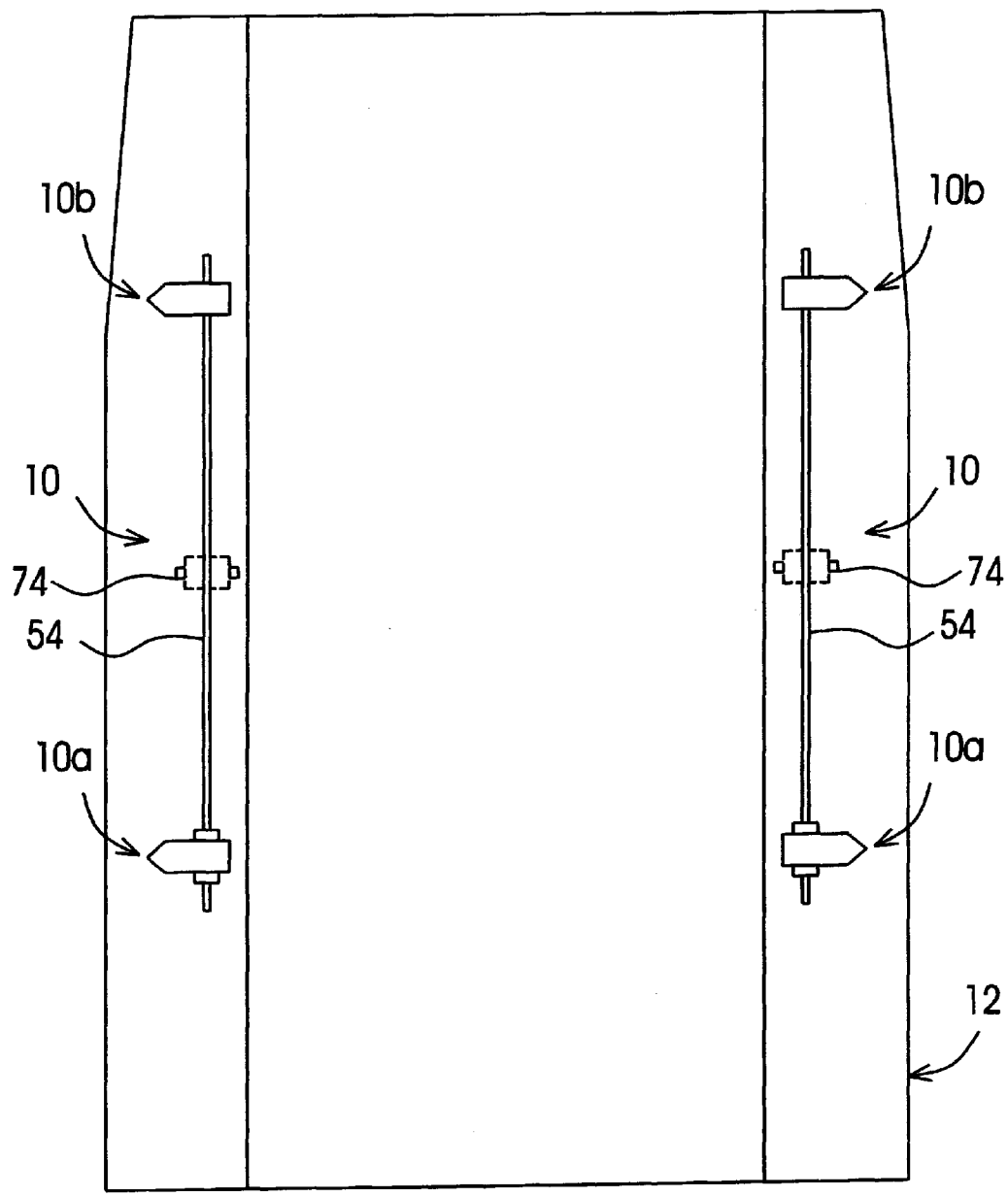
FIG. 4 is a schematic bottom view of the cab in FIG. 1, showing the locations of the master assembly and slave assembly.

In accordance with another preferred embodiment shown in FIG. 4, the clamp assembly 10 generally includes a master assembly 10a and a slave assembly 10b. The master assembly 10a is identical to the embodiment illustrated in FIGS. 2 and 3 except that the worm gear shaft 54 extends through the slave assembly 10b which is mounted to the undersurface of the same flange 28 of the sidewall of the cab as the master assembly 10a is, and spaced apart from the master assembly 10a. Since the worm gear shaft 54 must extend through the engagement member 58 of the master assembly, the key member 60 may not be used and another mechanical arrangement would be well known to those skilled in the art. One example will be described below in the slave assembly 10b.

Figure 5:
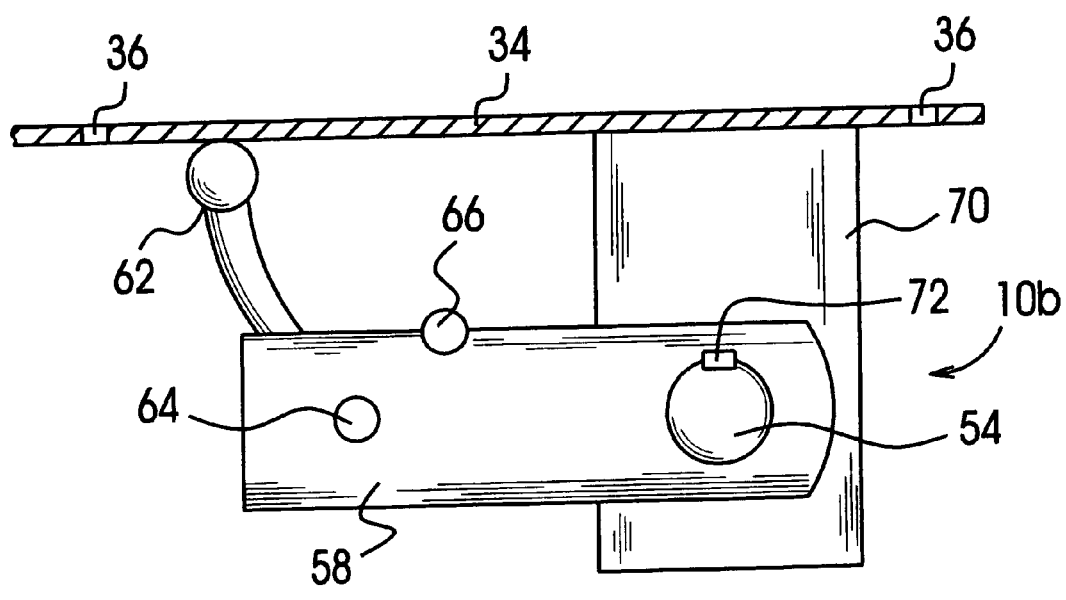
FIG. 5 is a side-elevational view of the slave assembly in FIG. 4.

The slave assembly 10b is described with reference to FIG. 5. Similar to the master assembly 10a, the slave assembly 10b includes the base plate 34 with mounting bores 36, adapted to be mounted to the transverse offset section 18 of the cab. A bracket member 70 is attached to the undersurface of the base plate 34. The engagement member 58 is fixed at its one end to the extended worm gear shaft 54 using a key 72. The worm gear shaft 54 extends through the bracket member 70 and is rotatably supported thereon so that the engagement member 58 of the slave assembly 10b is synchronized in a pivotal movement with the engagement member of the master assembly when the worm shaft 42 of the master assembly is rotated by the tool 45. The engagement member 58 of the slave assembly is similar to the equivalent of the master assembly 10a, being made of a U-shape metal strip.

The abutment member 62 is pivotally mounted through the pivot pin 64 to the free end of the engagement member 58 and is pivotable between the closed end of the U-shaped structure and the stop bar 66. In a synchronization model, the engagement and abutment members of the slave assembly follow the movement of their equivalents of the master assembly between the operative and inoperative positions, and the slave assembly 10b is manipulated by the master assembly 10a for releasably securing the cab 12 to the pick-up truck box 14. Nevertheless, the slave assembly 10b permits, in a limited extent, a discrepancy between the truck box and the cab in instant deformation when the engagement member 58 is locked in the operative position and the abutment member 62 abuts the undersurface of the flange of the sidewall of the truck box. This is resulted from a certain degree of twisting flexibility of the long extending worm gear shaft 54 since a torque for locking the clamp assembly in the operative position is originated in the master assembly and transmitted through the worm gear shaft 54 to the slave assembly 10b. Meanwhile, the locking torque originated by the locking sleeve 46 in the master assembly 10a, without being transmitted through the length of the worm gear shaft 54, rigidly holds the engagement and abutment members of the master assembly in position to prevent the cab from displacement with respect to the truck box.

In accordance with a further embodiment of the invention, a second slave assembly 10b may replace the master assembly 10a shown in FIG. 4, and a worm and worm gear assembly 74, shown in broken lines in FIG. 4, can be mounted on the shaft 54 between the two slave assemblies to drive the engagement members 58 of both slave assemblies to pivot concurrently between the operative and inoperative positions. In this embodiment, the worm shaft may extend outwardly in both directions so that the worm shaft can be rotated using the tool from either inside or outside of the cab.

The above-described embodiments are examples only for illustrating the invention. Other well known mechanisms may be used to replace the worm and worm gear set for converting a rotation about an axis perpendicular to the pivoting axis of the engagement member so that the clamp assembly can be operated from the inside of the cab. Other well known mechanisms also may be used to replace the pivotal movement of the abutment member for adjusting the abutting point to compensate for size variations of the pick-up truck box.

Modifications and improvements to the above-described embodiments of the invention may become apparent to those skilled in the art. The foregoing description is intended to be exemplary rather than limiting. The scope of the invention is therefore intended to be limited solely by the scope of the appended claims.

We claim:

1. A clamp assembly for releasably securing a topper to a pick-up truck box having sidewalls with an inwardly extended flange, the topper including sidewalls having transverse offset sections over the sidewalls of the pick-up truck box respectively, wherein the clamp assembly comprises:
   an elongate engagement member adapted to be pivotally mounted to either one of the sidewalls of the topper so that the engagement member is pivotable between an operative position in which a free end of the engagement member extends beneath the inwardly extended flange and forcibly abuts a undersurface of the flange, and an inoperative position in which the free end of the engagement member clears the flange;
   a rotating device operatively connected to the engagement member to convert a rotation about an axis substantially perpendicular to a pivotal shaft of the engagement member to a pivotal movement of the engagement member between the operative and inoperative positions; and
   a locking device to lock the engagement member in the operative position.

2. The clamp assembly as claimed in claim 1 wherein the abutment of the engagement member against the undersurface of the inwardly extended flange is achieved through an abutment member, the abutment member being pivotally mounted to the free end of the engagement member and adapted to be pivotally guided between an inner surface of the sidewall of the pick-up truck box and a downwardly suspending edge of the flange into a position to properly abut the undersurface of the flange when the engagement member is pivotally moved into the operative position.

3. The clamp assembly as claimed in claim 1 wherein the rotating device includes a worm and a worm gear operatively engaging each other, the worm gear being mounted on the pivotal shaft to drive the engagement member in the pivotal movement.

4. The clamp assembly as claimed in claim 3 wherein a rotary axis of the worm is adapted to align an aperture in the sidewall of the topper when the engagement member is pivotally mounted to the topper so that the worm is adapted to be driven to rotate using a tool from within the topper.

5. The clamp assembly as claimed in claim 4 wherein the rotating device includes a casing for supporting the worm and worm gear therein, the casing being attached to a base plate which is adapted to be mounted to an undersurface of the transverse offset section of the sidewall.

6. The clamp assembly as claimed in claim 5 wherein the rotating device includes a worm shaft rotatably supported on the casing, the worm shaft extending from the worm and having a connector at a distal end adapted for releasably engaging a socket of the tool which drives the worm in rotation.

7. The clamp assembly as claimed in claim 6 wherein the locking device is mounted on the worm shaft, restrained in rotation with respect to the casing and slidable between a locking position in which the locking device engages the connector of the worm shaft to prevent the worm shaft from rotation with respect to the casing, and an unlocking position in which the locking device disengages the connector.

8. The clamp assembly as claimed in claim 7 wherein the locking device is biased using a spring towards the locking position.

9. A clamp assembly for releasably securing a topper to a pick-up truck box having sidewalls with inwardly extended flange, the topper including sidewalls having transverse offset sections over the sidewalls of the pick-up truck box respectively, wherein the clamp assembly comprises:
   a master assembly including:
      an elongate engagement member adapted to be pivotally mounted to either one of the sidewalls of the topper so that the engagement member is pivotable between an operative position in which a free end of the engagement member extends beneath the inwardly extended flange and forcibly abuts a undersurface of the flange, and an inoperative position in which the free end of the engagement member clears the flange;
      a rotating device operatively connected to the engagement member to convert a rotation about an axis substantially perpendicular to a pivotal shaft of the engagement member to a pivotal movement of the engagement member between the operative and inoperative positions; and
      a locking device to lock the engagement member in the operative position; and
   a slave assembly including:
      an elongate engagement member pivotable between an operative position and an inoperative position similar to the master assembly, the elongate engagement member being adapted to be pivotally mounted to the transverse offset section of the topper to which the master assembly is mounted, and spaced apart from the master assembly, the engagement member being operatively connected to the pivotal shaft of the master assembly so that the engagement member of the slave assembly is manipulated between the operative and inoperative positions, the locking and unlocking conditions following the performance of the master assembly.

10. The clamp assembly as claimed in claim 9 wherein the abutment of the respective engagement members of the master and slave assembly against the undersurface of the inwardly extended flange is achieved through respective abutment members, each of the abutment members pivotally mounted to a free end of the corresponding engagement member and adapted to be pivotally guided between an inner surface of the sidewall of the pick-up truck box and a downwardly suspending edge of the flange into a position to properly abut the undersurface of the flange when the engagement member is pivotally moved into the operative position.

11. A clamp assembly for releasably securing a self-enclosed topper to a pick-up truck box having sidewalls with inwardly extended flange, the topper including sidewalls having transverse offset sections over the sidewalls of the pick-up truck box respectively, wherein the clamp assembly comprises:
   a master assembly including:
      a base plate adapted to be mounted to an undersurface of the transverse offset section of either one of the sidewalls of the topper;
      a casing attached to the base plate;
      a worm and a worm gear operatively supported within the casing, the worm including a worm shaft extending from the worm and a connector at a distal end of the shaft, the worm shaft aligning an aperture in the sidewall of the topper for engaging a socket of a tool operated from within the topper to rotate the worm shaft;

an elongate engagement member including a pivotal shaft rotatably supported by the casing and driven by the worm gear and a abutment member pivotally mounted to a free end of the engagement member so that the engagement member is pivotable between an operative position in which the free end of the engagement member is adapted to extend beneath the inwardly extended flange and the abutment member is adapted to be pivotally guided between an inner surface of the sidewall of the pick-up truck box and a downwardly suspending edge of the flange into a position to properly and forcibly abut the undersurface of the flange, and an inoperative position in which the abutment member is adapted to clear the flange;

a locking device mounted on the worm shaft, restrained in rotation with respect to the casing and slidable between a locking position in which the locking device engages the connector of the worm shaft to prevent the worm shaft from rotation with respect to the casing and an unlocking position in which the locking device disengages the connector; and a slave assembly including:

a base plate adapted to be mounted to the undersurface of the transverse offset section to which the base plate of the master assembly is adapted to be mounted, and spaced apart from the base plate of the master assembly;

a bracket attached to the base plate;

an elongate engagement member pivotally mounted on the bracket and including a abutment member pivotally mounted to a free end thereof, the engagement member being operatively connected to the pivotal shaft of the master assembly so that the engagement and abutment members of the slave assembly are manipulated between an operative and inoperative positions, a locking and unlocking conditions, similar to the master assembly, following the performance of the master assembly.

12. The clamp assembly as claimed in claim 3 further comprising a second engagement member identical to the engagement member, mounted on the pivotal shaft of the engagement member and spaced apart from the engagement member; the worm and worm gear being mounted on the pivotal shaft between the two engagement members to drive both the engagement members to pivot concurrently between the operative and inoperative positions.

* * * * *